(12) United States Patent
Fahnestock

(10) Patent No.: X3096
(45) Date of Patent: Apr. 23, 1819

(54) MINERAL WATER, APPARATUS

(76) Inventor: Samuel Fahnestock

Samuel Fahnestock

Letters Patent.

The Schedule referred to in these Letters Patent and making part of the same, containing a description in the words of the said Samuel Fahnestock, himself of his improvement in the apparatus for making Mineral Waters.

The present apparatus used for preparing Mineral Waters is a copper tinned vessel of an elipsoidical form. which is three fourths filled with water into which the carbonic acid gas is strongly forced by being pumped out of the reservoir where it is collected by means of a condensing pump through a stop cock and a copper tinned siphon, closed by a valve, when the water in said vessel is sufficiently charged with the gas and remains for some time in said vessel, the carbonic acid acts upon the copper and tin, and decomposes some of it and forms the carbonate of copper and tin which is kept in a state of solution in the water & gives it a nauseous taste of the metals, this has had very often disagreeable and pernicious effects on the stomach.

Improvement. The improvement of the subscriber is to effectually prevent the impurity which copper and tin gives to the artificial mineral waters when prepared in those metals. By means of a stone ware apparatus or vessel (or any other kind of vessel or apparatus, whose composition will not effect the purity of the mineral waters) inclosed in a copper tinned vessel (or in any other kind of vessel, which will confine the gas to the interior vessel) open at its top.

Mode of using it. This interior vessel must be filled about three fourths with pure water also the space between said vessels. The whole apparatus to be kept in a perpendicular position, the siphon made of silver (or any other metal which which will not effect the purity of the water) is introduced
into the mouth of the exterior vessel nearly down to the
bottom of the interior vessel, the stop cock is screwed into
the mouth of the exterior vessel, with a piece of leather between
its shoulders, to make it perfectly air tight. The carbonic acid
gas is strongly forced into the water, by being pumped out of the reser
=voir where it is collected by means of a condensing pump
through the stop-cock and siphon, into the interior vessel closed
by a valve, and the gas becomes diffused throughout the water
in the interior & exterior of said inclosed vessels; which vessel
is preserved by an equal pressure acting against the parities
of the exterior vessel, retaining the impure water between said
vessels, and the water in the interior vessel will be perfect=
ly pure, and fully saturated with the carbonic acid gas, & will
remain so until the whole is run off: Then unscrew the stop
cock, and invert the whole apparatus, and the impure water
between said vessels will discharge itself through the mouth
of the exterior vessel. In this apparatus wine, cider and
Beer, may be impregnated with the carbonic acid gas to
any degree; and also the solution of magnesia and soda is
prepared perfectly pure in it &c.

Exd. Witnesses Samuel Fahnestock
Wy[illegible] George Fahnestock
M. W. Barton

1750

Patented April 23. 1819.

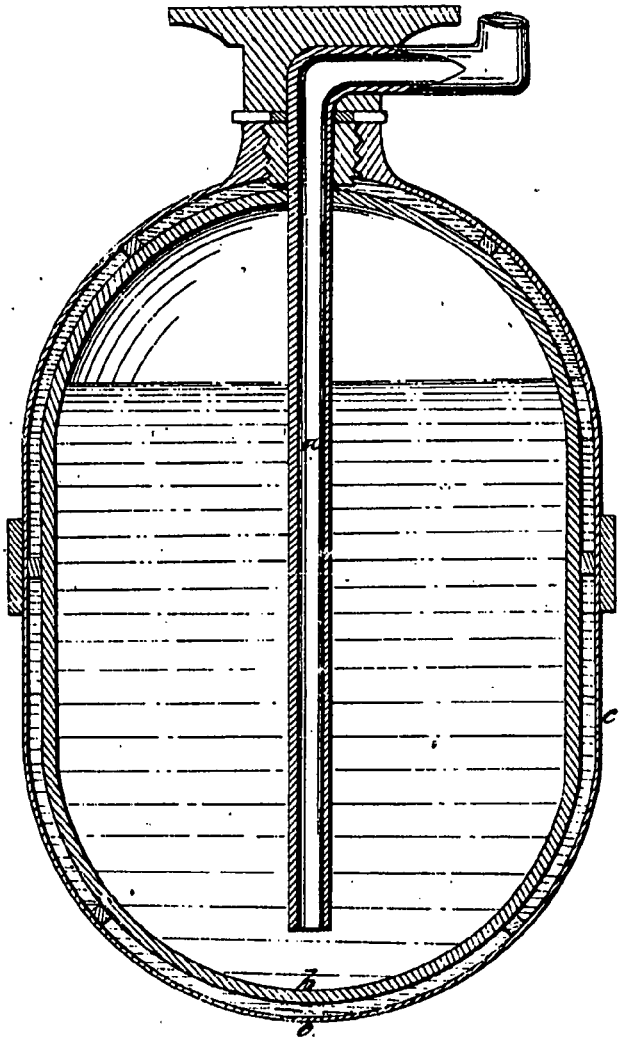

S. Fahnestock.
Soda Fountain.
Patented Apr. 23, 1819.